US006664899B1

United States Patent
Tsuchihashi

(10) Patent No.: US 6,664,899 B1
(45) Date of Patent: Dec. 16, 2003

(54) VEHICULAR WIRELESS CONTROL APPARATUS AND PORTABLE UNIT FOR THE SAME

(75) Inventor: Choichiro Tsuchihashi, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 09/281,805

(22) Filed: Mar. 31, 1999

(30) Foreign Application Priority Data

Mar. 31, 1998 (JP) .......................................... P10-087317

(51) Int. Cl.[7] .............................. G08C 19/00; G06K 7/08
(52) U.S. Cl. ................... 340/825.69; 340/5.1; 340/10.2; 340/10.34; 307/10.2; 307/104; 180/287
(58) Field of Search ..................... 340/825.69, 825.72, 340/5.62, 5.61, 5.72, 10.42, 10.5; 307/10.2, 10.1, 104; 180/287; 343/713, 741, 788, 841

(56) References Cited

U.S. PATENT DOCUMENTS

| | | | | |
|---|---|---|---|---|
| 4,760,394 A | * | 7/1988 | Takeuchi et al. | ......... 340/10.42 |
| 5,379,033 A | * | 1/1995 | Fujii et al. | ................... 340/5.64 |
| 5,973,611 A | * | 10/1999 | Kulha et al. | ............... 340/5.62 |
| 6,011,320 A | * | 1/2000 | Miyamoto et al. | ......... 307/10.2 |

FOREIGN PATENT DOCUMENTS

| | | | | |
|---|---|---|---|---|
| EP | 0875851 A2 | * | 4/1998 | ............ G06K/7/08 |
| GB | 2292866 | * | 3/1996 | .......... G06K/19/07 |
| JP | 05156851 | | 6/1993 | |
| JP | 08142799 | | 6/1996 | |

* cited by examiner

Primary Examiner—Michael Horabik
Assistant Examiner—William Bangachon
(74) Attorney, Agent, or Firm—Wenderoth, Lind & Ponack, L.L.P.

(57) ABSTRACT

A wireless control apparatus for vehicles in that reduces the drain on an internal power source of a portable unit so that the internal power source can be used for a long period of time without being changed. A wireless control apparatus for vehicles including a control apparatus body provided on the vehicle side, and a portable unit carried by the driver. The portable unit has a start signal receiver for receiving a start signal from the vehicle side, a communication signal transmitter for transmitting a communication signal to the vehicle side, a controller for controlling the operation of the communication signal transmitter, and an operation power switching device for selecting between a signal power operation mode in which the portable unit operates from electric power obtained from the start signal and a power source operation mode in which the portable unit operates from an internal power source. When inoperative, the portable unit is held in the signal power operation mode. After the receipt of the start signal, the portable unit is actuated and switching to the power source operation mode is performed.

10 Claims, 8 Drawing Sheets

VEHICULAR WIRELESS CONTROL APPARATUS AND PORTABLE UNIT FOR THE SAME

BACKGROUND OF THE INVENTION

1. Field of the Invention

The present invention relates to a wireless control apparatus for vehicles which wirelessly controls an apparatus located on a vehicle (hereinafter referred to as a vehicle side apparatus), and a portable unit (the location of which is hereinafter referred to as a portable unit side) used for the control apparatus.

2. Description of the Related Art

Conventionally there have been proposed various types of wireless control apparatuses for vehicles which wirelessly control a vehicle-side operating apparatus such as locking means for locking doors. A known exemplary wireless control apparatus is disclosed in Japanese Unexamined Patent Publication JP-A 5-156851 (1993). The control apparatus disclosed in 5-156851 comprises a transmission circuit, reception circuit and microcomputer provided on the vehicle side and a transmission circuit, reception circuit and ID (identification) code generating circuit provided on the portable unit side. In this wireless control apparatus, the vehicle-side transmission circuit generates search waves which are sent out to the portable unit. When the driver carrying the portable unit approaches the vehicle, the reception circuit of the portable unit receives the search waves. Then, the ID code generating circuit of the portable unit generates an ID code, and radio waves carrying the ID code information are transmitted from the transmission circuit of the portable unit to the vehicle side. When the vehicle-side reception circuit receives the radio waves from the portable unit, the vehicle-side microcomputer determines whether the ID code transmitted from the portable unit side coincides with the specific code of the vehicle. When the ID code transmitted from the portable unit side coincides with the specific code of the vehicle, in the case where the doors are locked, the microcomputer actuates an unlocking means to unlock the doors. When the ID code transmitted from the portable unit side does not coincide with the specific code of the vehicle, the unlocking means is not actuated and in the case where the doors of the vehicle are locked, the locked state is maintained.

In this wireless control apparatus, in order that the door locked state is automatically released when the driver approaches the vehicle, it is necessary to always, in other words, substantially continuously or intermittently at predetermined time intervals, send out the search waves from the vehicle side and it is necessary to always hold the portable unit in a state in which the search waves can be received.

Generally, a transmission circuit, reception circuit and microcomputer provided on the vehicle side operate from a battery power source mounted on the vehicle, and the transmission circuit, the reception circuit and the ID code generating circuit provided on the portable unit side operate from a battery power source (internal power source) incorporated in the portable unit. Therefore, in the case where the search waves are always sent out from the vehicle side, the power of the car-mounted battery power source is consumed while the search waves are being sent out, and in the case where the portable unit is held in the reception possible state, the power of the incorporated battery power source is consumed. Since the car-mounted battery power source is charged by driving the vehicle, the drain on the car-mounted battery power source for the search waves does not cause a problem. However, in the case of the incorporated battery power source, which is never charged, when the state in which the search waves can be received is maintained over a long period of time, the power of the incorporated battery power source is consumed, so that it is necessary to change the incorporated battery power source.

SUMMARY OF THE INVENTION

An object of the invention is to provide a wireless control apparatus for vehicles in which drain on an internal power source on a portable unit side is reduced so that the internal power source can last for a long period of time without being replaced.

An object of the invention is to provide a wireless control apparatus for vehicles in which the drain on an internal power source on a portable unit side is reduced so that the internal power source can last for a long period of time without being replaced.

The invention provides a portable unit of a wireless control apparatus for vehicles, comprising a start signal reception means for receiving a start signal for electromagnetic induction from a vehicle side; a reset means for generating a reset signal based on the start signal received by the start signal reception means; a memory means for storing vehicle information; a communication signal transmitting means for transmitting a communication signal to the vehicle side; a control means for controlling operation of the communication signal transmitting means; and an operation power switching means for selecting between a signal power operation mode in which the portable unit operates from electric power obtained from the start signal and a power source operation mode in which the portable unit operates from an internal power source.

In the case where the start signal from the vehicle side is received in the signal power operation mode, the control means operates from the electric power obtained from the start signal, while the control means is reset by the reset signal of the reset means generated based on the start signal. Thereafter the operation power switching means switches from the signal power operation mode to the power source operation mode. Accordingly, the control means operates from the internal power source and the communication signal transmitting means transmits to the vehicle side the vehicle information stored in the memory means.

According to the invention, the portable unit operates in the signal power operation mode, in which the portable unit operates from the electric power obtained from the start signal from the vehicle side, and in the power source operation mode in which the portable unit operates from the internal power source. In a standby state, in which the start signal from the vehicle side is received, the portable unit is held in the signal power operation mode. Therefore, in the standby state, the power of the internal power source of the portable unit is substantially not consumed, so that the internal power source can be used for a long period of time without being replaced. When the start signal from the vehicle side is received under this standby state, since the portable unit is held in the signal power operation mode, the control means operates from the electric power obtained from the start signal and the reset means generates the reset signal based on the start signal to reset the control means. Then, the operation power switching means switches from the signal power operation mode to the power source operation mode, so that the control means operates from the internal power source. As described above, since the portable unit operates from the internal power source when the driver approaches the vehicle, the internal power source can be effectively used and the portable unit operates from sufficient power when used.

The invention is characterized in that the portable unit comprises a communication signal reception means for receiving a communication signal from the vehicle side. The communication signal from the vehicle side includes a vehicle-side identification code, whereas the vehicle information stored in the memory means includes a portable-unit-side identification code. When the communication signal reception means receives the communication signal from the vehicle side, the control means compares the vehicle-side identification code included in the communication signal and the portable-unit-side identification code. When the vehicle-side identification code included in the communication signal and portable-unit-side identification code are different, the operation power switching means switches from the power source operation mode to the signal power operation mode, whereby the operation of the control means is stopped.

According to the invention, the communication signal from the vehicle side includes the vehicle-side identification code. The portable unit includes the communication signal reception means for receiving the communication signal from the vehicle side and the memory means in which the portable-unit-side identification code is stored. When the communication signal from the vehicle side is received by the communication signal reception means of the portable unit, the control means compares the vehicle-side identification code included in the communication signal and the portable-unit-side identification code. When the identification codes are different, the operation of the controller is stopped, and the portable unit is placed in a reception signal waiting state. In other words, switching to the signal power source operation mode is performed. Therefore, when the identification codes are different, the operation of the portable unit is stopped, and the drain on the internal power source can further be reduced.

The portable unit of the invention further comprises a carrier sensing means for determining a reception condition of the communication signal. When a detection signal level of the communication signal received by the communication signal reception means is not lower than a predetermined level, the carrier sensing means generates a communication possible signal. When the generation of the communication possible signal is not performed continuously for a predetermined time, the operation power switching means switches from the power source operation mode to the signal power operation mode. Accordingly, the operation of the control means is stopped.

According to the invention, the portable unit is provided with the carrier sensing means. The carrier sensing means determines the detection signal level of the communication signal received by the communication signal reception means, and generates the communication possible signal when the signal level is not lower than the predetermined level. Consequently, when the driver approaches the vehicle, the detection signal level of the communication signal received by the communication signal reception means increases and the carrier sensing means generates the communication possible signal, so that communication of the communication signal between the portable unit and the vehicle side can be performed. When the driver moves away from the vehicle, the detection signal level of the communication signal received by the communication signal reception means decreases and the generation of the communication possible signal is finished. When the generation of the communication possible signal is not performed continuously for the predetermined time, the operation power switching means switches from the power source operation mode to the signal power operation mode, so that the operation of the control means is finished. Therefore, when the driver is away from the vehicle for the predetermined time, the portable unit is placed in the reception signal waiting state and the operation of the portable unit is stopped, so that the drain on the internal power source can be reduced.

The invention provides a wireless control apparatus for vehicles which wirelessly controls an apparatus on a vehicle side by the use of a portable unit. The apparatus comprises, on the vehicle side, a start signal transmission module for transmitting a start signal for electromagnetic induction, a vehicle-side communication signal reception means for receiving a communication signal from the portable unit side, and a vehicle-side control means for controlling the operation of the vehicle-side apparatus, the start signal transmission module and the vehicle-side communication signal reception means. The apparatus comprises, on the portable unit side, a start signal reception means for receiving the start signal from the start signal transmission module, a reset means for generating a reset signal based on the start signal received by the start signal reception means, a portable-unit-side memory means for storing vehicle information, a portable-unit-side communication signal transmitting means for transmitting a communication signal to the vehicle side, a portable-unit-side control means for controlling operation of the portable-unit-side communication signal transmitting means, and an operation power switching means for selecting between a signal power operation mode in which the portable unit operates from electric power obtained from the start signal and a power source operation mode in which the portable unit operates from an internal power source.

In the case where the start signal from the start signal transmission module provided on the vehicle side is received by the start signal reception means of the portable unit in the signal power operation mode, the portable-unit-side control means operates from the electric power obtained from the start signal, while the portable-unit-side control means is reset by the reset signal of the reset means generated based on the start signal. Thereafter, the operation power switching means switches from the signal power operation mode to the power source operation mode. Accordingly, the portable-unit-side control means operates from the internal power source and the portable-unit-side communication signal transmitting means transmits the vehicle information stored in the portable-unit-side memory means to the vehicle-side communication signal reception means.

According to the invention, on the vehicle side is provided the start signal transmission module for transmitting the start signal for electromagnetic induction. On the portable unit side are provided the start signal reception means for receiving the start signal from the vehicle side and the operation power switching means for selecting between the signal power operation mode and the power source operation mode. In the standby state, in which the start signal from the vehicle is received, the portable unit is held in the signal power operation mode. Therefore, the power of the internal power source of the portable unit is substantially not consumed. When the start signal from the vehicle-side communication signal transmitting means is received by the portable-unit-side start signal reception means in the standby state, since the portable unit is held in the signal power operation mode, the portable-unit-side control means operates from direct current obtained by rectifying the start signal, and the reset means generates the reset signal based on the start signal, so that the portable-unit-side control means is reset. Then, the operation power switching means switches from the signal power operation mode to the power source operation mode, so that the portable-unit-side control means operates from the internal power source. As described above, since the portable unit operates from the internal power source when the driver approaches the vehicle, the internal power source can effectively be used so that the portable unit operates from sufficient power when used.

The invention is characterized in that the wireless control apparatus for vehicles further comprises, on the vehicle side, a vehicle-side memory means in which a vehicle-side identification code is stored, and a vehicle-side communication signal transmitting means for transmitting a communication signal from the vehicle side, wherein the communication signal from the vehicle side includes the vehicle-side identification code.

The invention is further characterized in that the portable unit comprises a portable-unit-side communication signal reception means for receiving the communication signal from the vehicle-side communication signal transmitting means, and wherein the vehicle information stored in the portable-unit-side memory means includes a portable-unit-side identification code.

Upon receipt of the communication signal from the vehicle-side communication signal transmitting means by the portable-unit-side communication signal reception means, the portable-unit-side control means compares the vehicle-side identification code included in the communication signal and the portable-unit-side identification code. In the case where the vehicle-side identification code included in the communication signal and the portable-unit-side identification code are different, the operation power switching means switches from the power source operation mode to the signal power operation mode, whereby the operation of the control means is stopped.

According to the invention, the communication signal from the vehicle includes the vehicle-side identification code. The portable unit includes the communication signal reception means for receiving the communication signal from the vehicle side and the memory means in which the portable-unit-side identification code is stored. When the portable-unit-side communication signal reception means receives the communication signal transmitted from the vehicle-side communication signal transmitting means, the portable-unit-side control means compares the vehicle-side identification code included in the communication signal and the portable-unit-side identification code. When the identification codes are different, the operation of the control means is stopped, and the portable unit is placed in a reception signal waiting state. In other words, switching to the signal power source operation mode is performed, so that the drain on the internal power source can be reduced.

The portable unit of the invention further comprises a portable-unit-side carrier sensing means for determining a reception condition of the communication signal from the vehicle-side communication signal transmitting means. In the case where a detection signal level of the reception signal received by the portable-unit-side communication signal reception means is not lower than a predetermined level, the carrier sensing means generates a communication possible signal. When the generation of the communication possible signal is not performed continuously for a predetermined time, the operation power switching means switches from the power source operation mode to the signal power operation mode, whereby the operation of the control means is stopped.

According to the invention, the portable unit is provided with the carrier sensing means. The carrier sensing means determines the detection signal level of the communication signal received by the portable-unit-side communication signal reception means, and generates the communication possible signal when the signal level is not lower than the predetermined level. Consequently, when the driver approaches the vehicle, the detection signal level of the communication signal received by the portable-unit-side communication signal reception means increases and the carrier sensing means generates the communication possible signal. When the driver moves away from the vehicle, the detection signal level of the communication signal received by the portable-unit-side communication signal reception means decreases and the generation of the communication possible signal is finished. When the generation of the communication possible signal is not performed continuously for the predetermined time, the operation power switching means switches from the power source operation mode to the signal power operation mode, so that the operation of the control means is finished.

It is characterized in that the start signal transmission module is provided with a composite antenna comprising a loop antenna and a ferrite bar antenna, and that regions having a high transmitting/receiving sensitivity of directivities of the loop antenna and the ferrite bar antenna are substantially perpendicular to each other.

According to the invention, the start signal transmission module is provided with the composite antenna, and since the composite antenna comprises the loop antenna and the ferrite bar antenna whose directivities are substantially perpendicular to each other, the directivity of the composite antenna can be increased with a comparatively simple structure and the design and the installation of the antenna are facilitated.

The invention is characterized in that the composite antenna is incorporated in a side mirror apparatus provided on a driver side of the vehicle, and that the side mirror apparatus is pivotable between a folded position where the side mirror apparatus is situated along the vehicle and an unfolded position where the side mirror apparatus outwardly protrudes from the vehicle in a lateral direction.

According to the invention, the composite antenna is incorporated in the side mirror apparatus provided on the driver side of the vehicle. When the driver carrying the portable unit approaches the driver-side door, the start signal from the composite antenna incorporated in the side mirror is received by the portable unit, so that the reception of the start signal is ensured. Under a condition where the side mirror is held in the folded position, the start signal from the composite antenna is outwardly sent out in the lateral direction of the driver-side door of the vehicle, so that the start signal from the vehicle side can be received by the portable unit with reliability.

The invention is characterized in that the vehicle-side apparatus is locking means for locking a door of the vehicle, that a proximity sensor is provided in association with the driver-side door of the vehicle, and that upon receipt of the information on the vehicle stored in the portable-unit-side memory means by the vehicle-side communication signal reception means, the vehicle-side control means is placed in a control waiting state, and when the proximity sensor generates a detection signal in the control waiting state, the vehicle-side control means releases the locking by the locking means.

According to the invention, the vehicle-side apparatus is the locking means for locking a door of the vehicle and the proximity sensor is provided in association with the driver-side door of the vehicle. Consequently, when the driver approaches the proximity sensor in the control waiting state, the proximity sensor generates the detection signal, so that the vehicle-side control means releases the locking by the locking means. Thus, the door locked state can be released without performing any operation.

The invention is characterized in that the vehicle-side apparatus includes, in addition to the locking means, any one of opening and closing means for opening and closing a trunk of the vehicle, side mirror actuation means for unfolding and folding the side mirror apparatus, and car-mounted apparatus actuation means for actuating a car-mounted apparatus.

According to the invention, in addition to the locking and unlocking of the door, any one of the opening and closing the trunk of the vehicle, the folding of the side mirror and the actuation of a car-mounted apparatus can be performed by the use of the portable unit.

The invention portable unit of the invention comprises voltage monitoring means for monitoring a voltage of the internal power source. When the voltage of the internal power source decreases to a predetermined value or lower, the portable-unit-side control means generates a control switching signal and the operation power switching means switches from the power source operation mode to the signal power operation mode based on the control switching signal. Additionally, the vehicle-side control means actuates the start signal transmission module based on the control switching signal from the portable unit side and the portable-unit-side control means operates from the electric power obtained from a power signal from the start signal transmission module.

According to the invention, the voltage monitoring means for monitoring the voltage of the internal power source of the portable unit is provided and when the voltage of the internal power source becomes the predetermined value or lower, the operation mode of the portable unit is switched from the power source operation mode to the signal power operation mode and the vehicle-side control means actuates the start signal transmission module. Consequently, the power signal from the start signal transmission module is transmitted to the portable unit and the portable-unit-side control means operates from the electric power obtained from the power signal, so that even when the internal power source is exhausted, the portable unit can be operated by the power signal from the vehicle side.

The invention provides a portable unit of a wireless control apparatus for vehicles. The apparatus comprises a direct current power generating means for generating direct current power upon receipt of a signal for electromagnetic induction, an internal power source, a memory means for storing vehicle information, a communication signal transmitting means for transmitting a communication signal, a control means for the portable unit for reading out the information stored in the memory means and causing the communication signal transmitting means to transmit the read-out information as a communication signal, and an operation power switching means. The operation power switching means selects, in response to an output of the direct current power generating means, a signal power operation mode for the portable unit where electric power from the internal power source is not supplied to the communication signal transmitting means and the control means in the case of the absence of output from the direct current power generating means. The operation power switching means selects in the presence of output from the direct current power generating means, a power source operation mode for the portable unit where the electric power from the internal power source is supplied to the communication signal transmitting means and the control means.

The invention provides a wireless control apparatus for vehicles which wirelessly controls an apparatus on a vehicle side by the use of a portable unit. The apparatus comprises a vehicle-side operation apparatus, a transmitting module for generating a signal for electromagnetic induction, a vehicle-side reception means for receiving a portable-unit-side communication signal, and a vehicle-side control means in response to an output from the vehicle-side reception means, for causing the vehicle-side operation apparatus to carry out a predetermined operation. The vehicle-side operation apparatus, the transmitting module, the vehicle-side reception means and the vehicle-side control means being mounted on a vehicle. The portable unit comprises a direct current power generating means for generating direct current power upon receipt of a signal for electromagnetic induction, an internal power source, a memory means for storing vehicle information, a communication signal transmitting means for transmitting a communication signal, a control means for the portable unit for reading out the information stored in the memory means and causing the communication signal transmitting means to transmit the read-out information as a communication signal, and an operation power switching means. The operation power switching means selects, in response to an output of the direct current power generating means, a signal power operation mode for the portable unit where electric power from the internal power source is not supplied to the communication signal transmitting means and the control means in the case of the absence of output from the direct current power generating means. The operational power switching means selects, in the presence of output from the direct current power generating means, a power source operation mode for the portable unit where the electric power from the internal power source is supplied to the communication signal transmitting means and the control means.

According to the invention, upon receipt of the signal for electromagnetic induction from the transmitting module mounted on the vehicle by the direct current power generating means of the portable unit, direct current power is generated. Due to the electric power, the operation power switching means is shifted from the signal power operation mode to the power source operation mode. Thereby the electric power from the internal power source of the portable unit is supplied to the portable-unit-side communication signal transmitting means and the portable unit control means, whereby the vehicle information read out from the memory is transmitted. The communication signal from the portable-unit-side communication signal transmitting means is received by the vehicle-side reception means mounted on the vehicle, and the vehicle-side control means causes the vehicle-side operation apparatus to carry out the predetermined operation. Thus, in the case where the signal for electromagnetic induction is not received, the portable unit is put into the signal power operation mode, and the electric power from the internal power source is not supplied to the portable-unit-side communication signal transmitting means nor to the control means for the portable unit. As a result, the drain on the internal power source can be reduced when the signal for electromagnetic induction is not received by the direct current power generating means.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
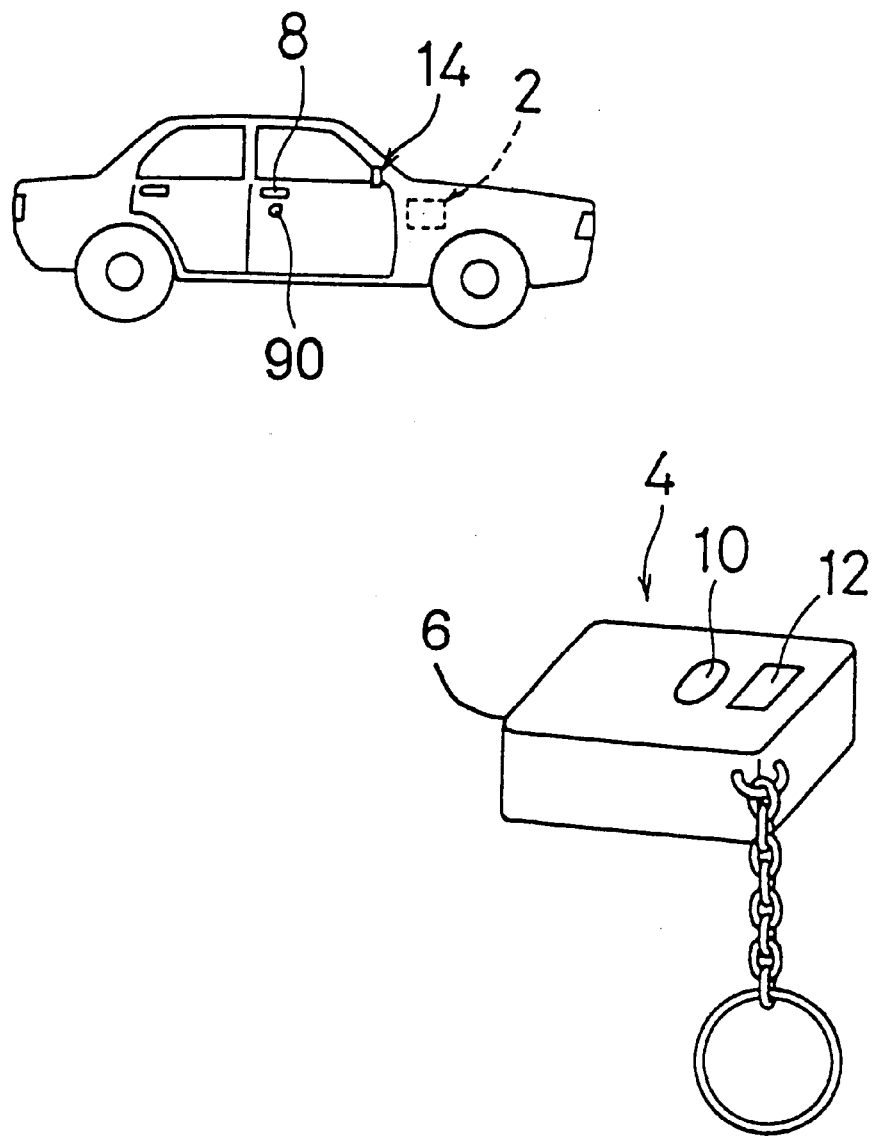
FIG. 1 is a view briefly showing a vehicle provided with an embodiment of a wireless control apparatus for vehicles according to the invention.

Now referring to the drawings, preferred embodiments of the invention are described below.

Figure 2:
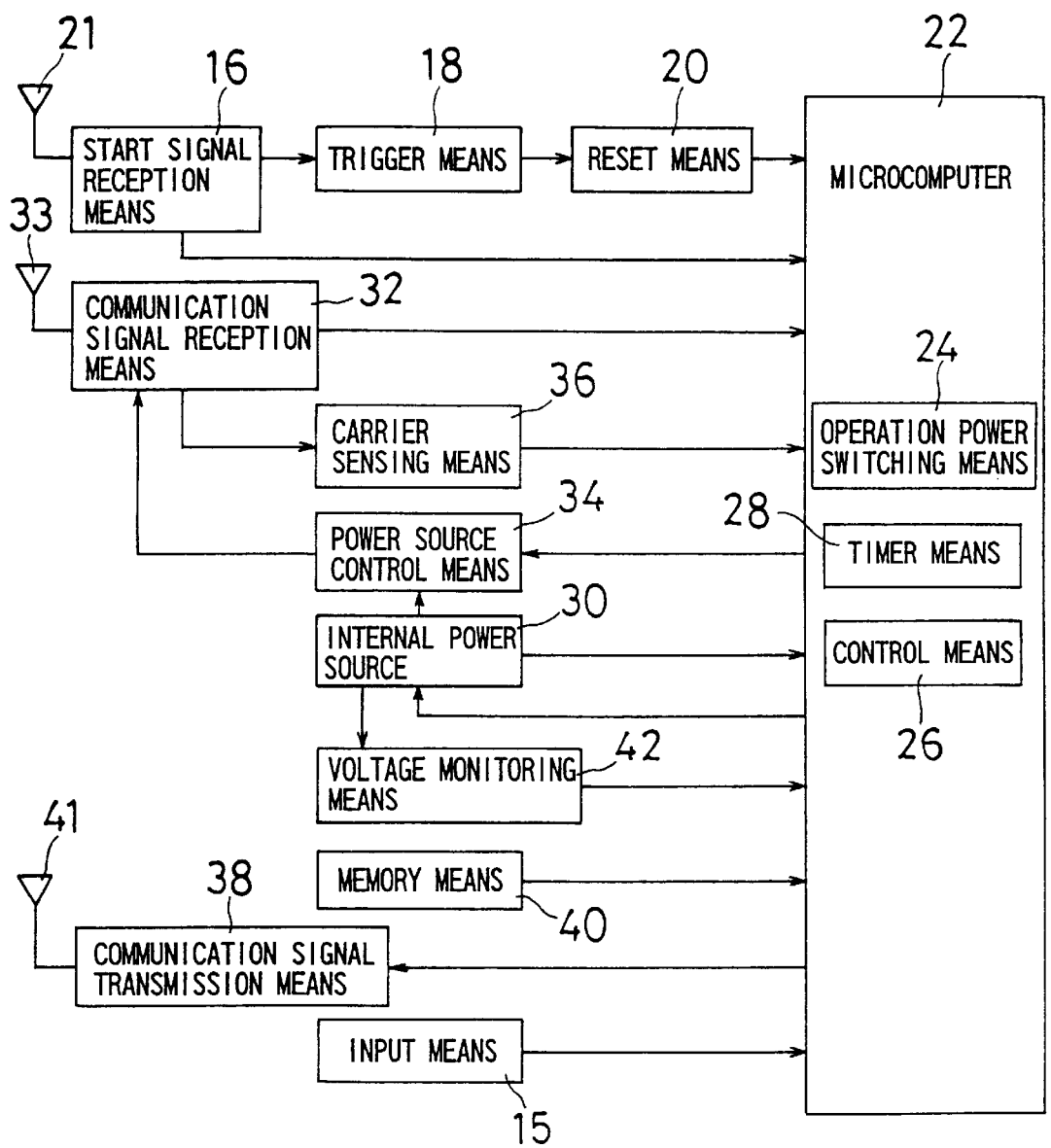
FIG. 2 is a block diagram briefly showing the configuration of a portable unit in the wireless control apparatus of FIG. 1.
Figure 3:
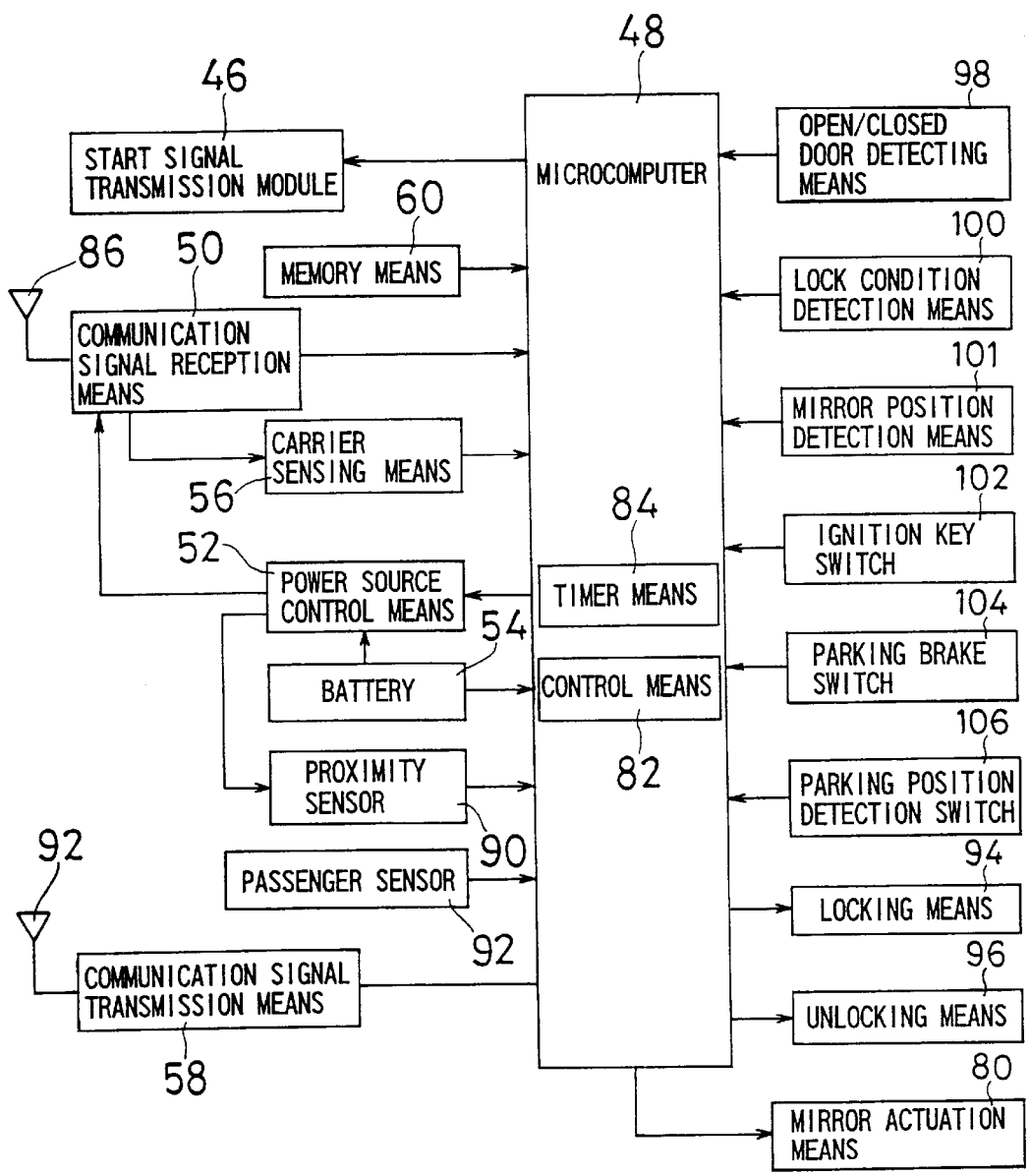
FIG. 3 is a block diagram briefly showing the configuration of a control apparatus body in the wireless control apparatus of FIG. 1.

Hereinafter, an embodiment of a wireless control apparatus for vehicles and a portable unit used for the same according to the invention will be described with reference to the attached drawings. FIG. 1 briefly shows an example of a vehicle provided with the wireless control apparatus for vehicles according to the invention. FIG. 2 is a block diagram briefly showing the portable-unit-side configuration in the wireless control apparatus of FIG. 1. FIG. 3 is a block diagram briefly showing the vehicle-side configuration in the wireless control apparatus of FIG. 1.

Referring to FIG. 1, the illustrated wireless control apparatus comprises a control apparatus body 2 mounted on a vehicle such as a car, and a portable unit 4 carried by a driver of the vehicle. First, the portable unit 4 will be described with reference to FIGS. 1 and 2. The illustrated portable unit 4 is a key ring type and has a comparatively small portable unit body 6 having a rectangular parallelepiped shape. Various elements are incorporated in the portable unit body 6. The portable unit 4 can be held by a hand of a driver to operate and has a size small enough to fit in the driver's pocket. On one surface (obverse surface) of the portable unit body 6, two operation selection switches 10 and 12 are provided. In this embodiment, the operation selection switch 10 is used for locking the doors of the vehicle. When the operation selection switch 10 is depressed, the wireless control apparatus is operated, so that the doors can be locked. The other operation selection switch 12 is used for unlocking the doors. When the operation selection switch 12 is depressed, the wireless control apparatus is put into operative state, so that the doors can be unlocked. In this embodiment, a pair of side mirror apparatuses 14 (while the side mirror apparatus 14 is provided on each of the driver side and the passenger side, the side mirror apparatus 14 on the driver side is illustrated) are folded in association with the door locking operation. Specifically, when the operation selection switch 10 is depressed to lock the doors, the side mirror apparatuses 14 are folded, and when the other operation selection switch 12 is depressed to unlock the doors, the mirror apparatuses 14 are unfolded. The operation selection switches 10 and 12 constitute input means 15 (see FIG. 2) of the portable unit 4. The portable unit 4 may be a thin card type instead of the key ring type.

Referring mainly to FIG. 2, the illustrated portable unit 4 is provided with start signal reception means 16, trigger means 18, reset means 20 and a microcomputer 22. The start signal reception means 16 receives a start signal, which is an alternating current magnetic field, from the vehicle side. In this embodiment, a start signal for electromagnetic induction is transmitted from the vehicle side, and received by the start signal reception means 16, which rectifies and smoothes it to convert into direct current power, which is supplied to the microcomputer 22. Moreover, the start signal is supplied to the trigger means 18. The trigger means 18 generates a trigger signal based on the start signal, and the trigger signal is supplied to the reset means 20. The reset means 20 generates a reset signal based on the trigger signal, and the reset signal is supplied to the microcomputer 22. In association with the start signal reception means 16, an antenna 21 for receiving the start signal is provided.

In this embodiment, the microcomputer 22 includes operation power switching means 24, control means 26 and timer means 28. The operation power switching means 24 is for switching the mode for actuating the portable unit 4, that is, the microcomputer 22, etc. In this embodiment, the switching is performed between a signal power operation mode and a power source operation mode. The signal power operation mode is for actuating the microcomputer 22 by power-converting the start signal for electromagnetic induction from the vehicle side, whereas the power source operation mode is for actuating the microcomputer 22 by using the power, for example, from the incorporated battery. The control means 26 controls the actuation of various means incorporated in the portable unit 4 and processes a received communication signal as required as described later. The timer means 28 counts a predetermined time.

In this embodiment, when the start signal reception means 16 receives the start signal from the vehicle side in the signal power operation mode, the start signal is power-converted and supplied to the microcomputer 22, so that the microcomputer 22, that is, the control means 26 is actuated. Then, the reset signal is supplied as mentioned above, so that the microcomputer 22, that is, the control means 26 is reset to start the operation of the microcomputer 22.

The portable unit 4 further comprises communication signal reception means 32, power source control means 34, carrier sensing means 36, communication signal transmitting means 38 and nonvolatile memory means 40 such as EEPROM. The communication signal reception means 32 receives the communication signal from the vehicle side.

The received communication signal is supplied to the microcomputer 22. In association with the communication signal reception means 32, an antenna 33 for receiving the communication signal is provided. The actuation of the power source control means 34 is controlled by the control means 26 of the microcomputer 22. When switching to the power source operation mode takes place, current from an internal power source 30 is supplied to actuate the power source control means 34, so that the communication signal from the vehicle side can be received. To the carrier sensing means 36, a reception signal from the communication signal reception means 32 is supplied. The carrier sensing means 36 generates a communication possible signal when the detection signal level of the received communication signal is not lower than a predetermined level, and supplies the communication possible signal to the microcomputer 22. The level of the portable-unit-side detection signal of the communication signal sent out from the vehicle side increases as the driver of the vehicle carrying the portable unit 4 approaches the vehicle. Therefore, when the driver is in a predetermined range from the vehicle that the driver drives, the detection signal level of the communication signal is the predetermined level or higher and the carrier sensing means 36 generates the communication possible signal, so that communication of the communication signal with the vehicle side becomes possible as described later. The communication signal transmitting means 38 transmits the communication signal from the portable unit 4 to the vehicle side. In association with the communication signal transmitting means 38, an antenna 41 for transmitting the communication signal is provided. In the memory means 40, a portable-unit-side identification code is stored. The identification code may be a vehicle code assigned to each individual vehicle or may be a personal code associated with the driver instead of the vehicle code. The wireless control apparatus may be configured so that the identification code can be changed as needed. In this embodiment, the communication signal transmitted from the communication signal transmitting means 38 includes control information regarding the vehicle, in other words, control information selected by the input means 15 (that is, whether the control is control associated with the locking of the doors and/or control associated with the side mirror apparatuses 14) in addition to the identification code stored in the memory means 40.

In association with the internal power source 30, voltage monitoring means 42 is further provided. The voltage monitoring means 42 monitors the voltage of the internal power source 30, generates a control switching signal when the power of the internal power source 30 is consumed until the voltage becomes a predetermined value or lower, and supplies the control switching signal to the microcomputer 22. When the control switching signal is thus generated, the operation power switching means 24 switches from the power source operation mode to the signal power operation mode, and thereafter, the microcomputer 22, etc. operate from the electric power obtained from the start signal from the vehicle side. In association with the start signal reception means 16, an antenna 21 for receiving the start signal is provided. The means 16, 18, 20, 32, 34, 36, 38, 40 and 42 in the portable unit 4 can be formed of, for example, electric circuits.

Next, referring mainly to FIG. 3, the control apparatus body 2 mounted on the vehicle will be described. The illustrated control apparatus body 2 is provided with a start signal transmission module 46, a microcomputer 48, communication signal reception means 50, a power source control means 52, a car-mounted battery 54, a carrier sensing means 56, a communication signal transmitting means 58 and a memory means 60. The start signal transmission module 46 is operation-controlled by the microcomputer 48, and sends out a start signal to the portable unit 4. In consideration of the drain on the car-mounted battery 54, a short pulse signal, for example, a pulse signal of approximately 2.5 ms is outputted twice at intervals of 100 ms.

Figure 4:
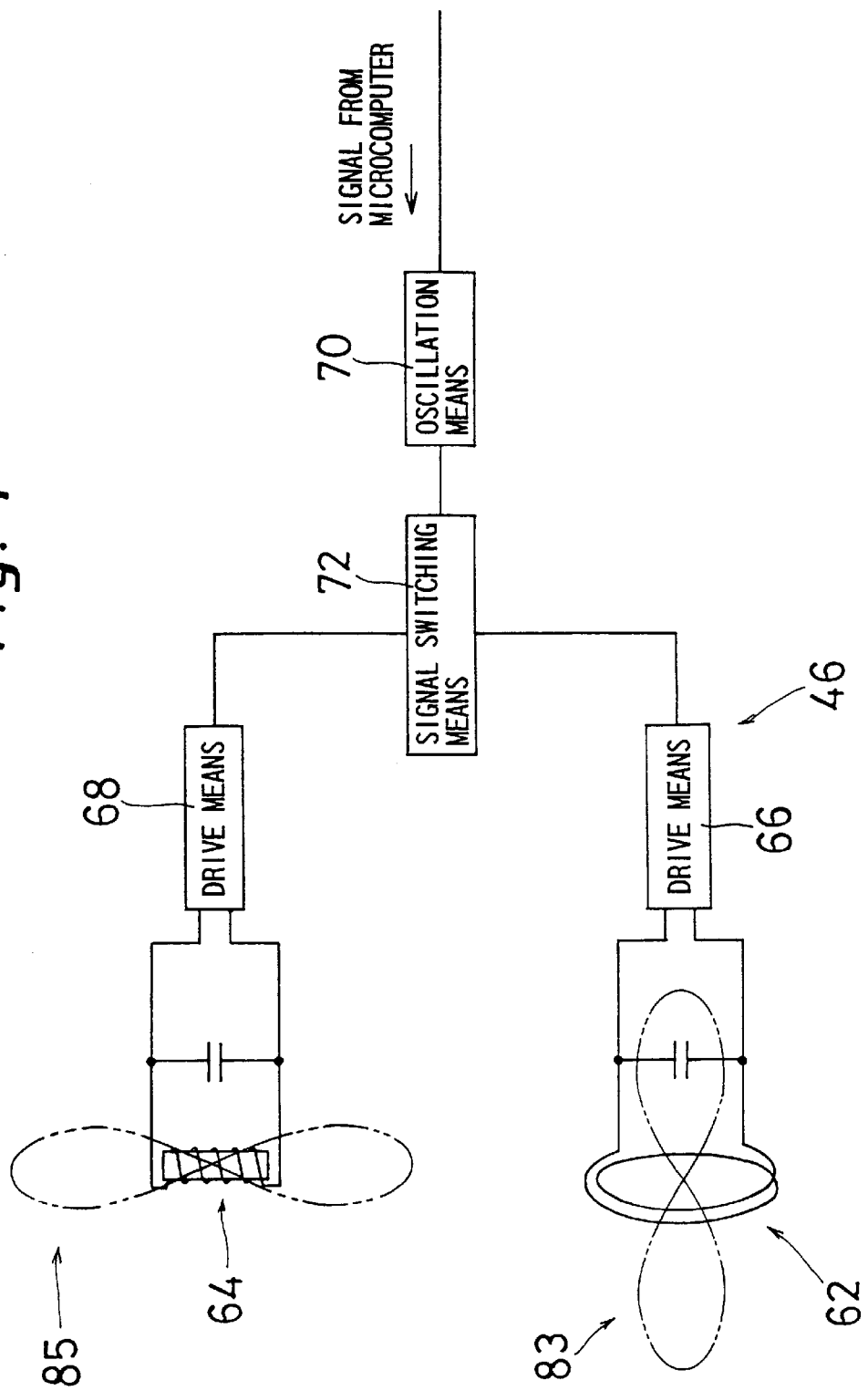
FIG. 4 is a block diagram briefly showing the configuration of a start signal transmission module in the control apparatus body of FIG. 3.

As the start signal transmission module 46, for example, the one as shown in FIG. 4 can favorably be used. Referring to FIG. 4, the start signal transmission module 46 has a composite antenna 66 (see FIG. 5) comprising a loop antenna 62 and a ferrite bar antenna 64. The loop antenna 62 is formed by winding a coil wire into a loop. The ferrite bar antenna 64 is formed by winding a coil around a bar formed of magnetic material such as ferrite as required. Drive means 67 is connected to the loop antenna 62. Drive means 68 is connected to the ferrite bar antenna 64. An actuation signal from the microcomputer 48 is supplied to oscillation means 70. The oscillation means 70 generates an oscillation signal in response to the actuation signal. The oscillation signal is selectively supplied to the drive means 67 of the loop antenna 62 and the drive means 68 of the ferrite bar antenna 64 through signal switching means 72. The pulse-form start signal supplied to the drive means 67 through the signal switching means 72 is amplified by the drive means 67. The amplified start signal is transmitted from the loop antenna 62. The start signal supplied to the other drive means 68 through the signal switching means 72 is amplified by the drive means 68. The amplified start signal is transmitted from the ferrite bar antenna 64. The composite antenna 66 converts the start signal from the oscillation means 70 into electromagnetic waves in a long wavelength region or in a short wavelength region and transmits the electromagnetic waves to the portable unit 4. In this composite antenna 66, it is desirable that the direction 83 of the directivity of the loop antenna 62 and the direction 85 of the directivity of the ferrite bar antenna be substantially perpendicular to each other. By the directivities 83, 85 of the two kinds of antennas 62 and 64 being thus substantially perpendicular to each other, the directivity of the composite antenna 66 increases, so that the start signal from the composite antenna 66 can be transmitted over a wide range.

Figure 5:
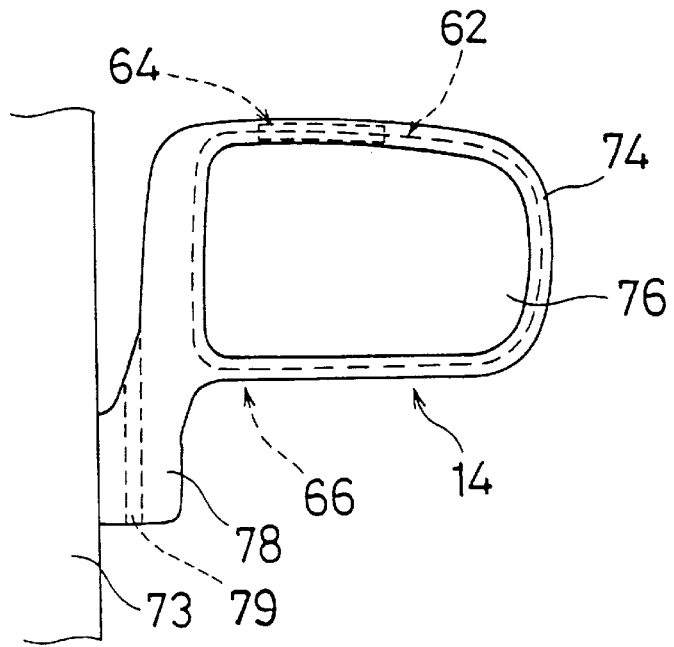
FIG. 5 is a view showing a side mirror apparatus having a composite antenna in the start signal transmission module of FIG. 4.
Figure 6:
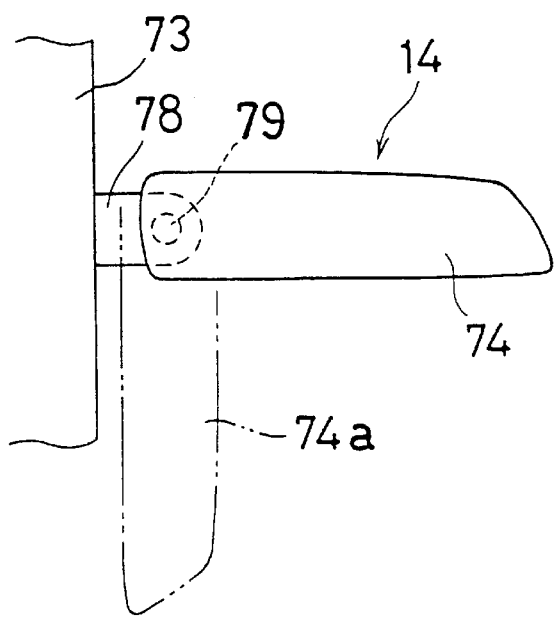
FIG. 6 is a plan view of assistance for explaining an unfolded position and a folded position of the side mirror apparatus.
Figure 7:
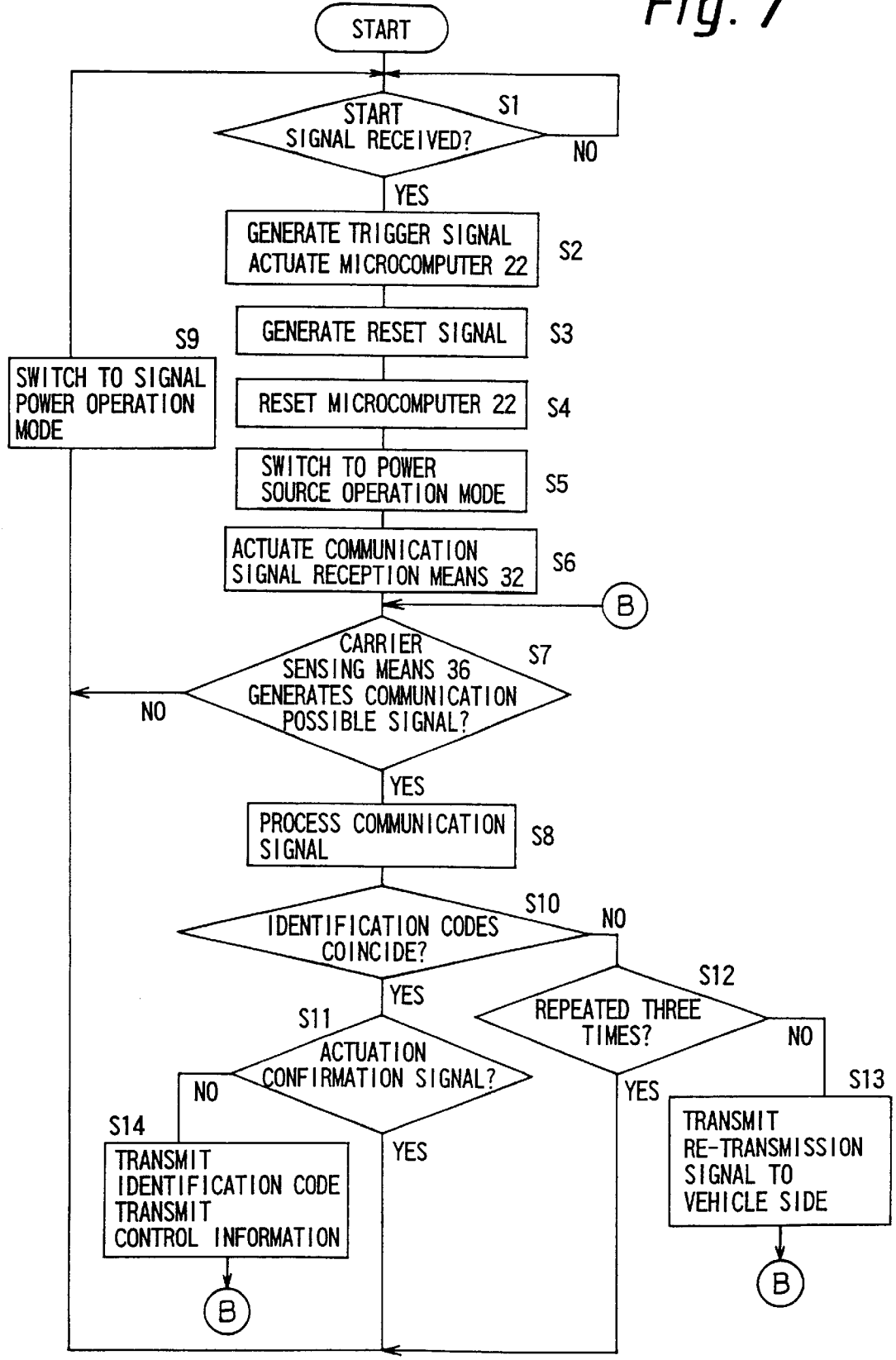
FIG. 7 is a flowchart showing a portable-unit-side operation performed when the doors are unlocked.

The composite antenna 66 in the start signal transmission module 46 can be disposed as shown in FIG. 5. Referring to FIG. 5, the side mirror apparatus 14 is attached to a driver-side door 73 of the vehicle. The side mirror apparatus 14 has a mirror apparatus body 74 made of nonmagnetic material such as a synthetic resin. On the rear surface (the surface facing toward the rear of the vehicle) of the mirror apparatus body 74, that is, on the front side surface in FIG. 5, a side mirror 76 for viewing the rear of the vehicle is attached so as to be angle-adjustable. A support member 78 is attached to the driver-side door 73. The side mirror apparatus body 74 is attached to the support member 78 so as to be pivotable between an unfolded position shown by the solid line in FIGS. 5 and 6 and a folded position 14a shown by the chain double-dashed line in FIG. 6 about a shaft 79 having an axial line along which the inner end of the side mirror apparatus body 74 vertically extends. When placed in the unfolded position, the mirror apparatus body 74 outwardly protrudes in a lateral direction of the vehicle (in the horizontal direction in FIGS. 5 and 6); accordingly, the side mirror 76 of the mirror apparatus body 74 faces the rear of the vehicle, so that when seated in the driver's seat, the driver can view the rear of the vehicle through the side mirror 76. When placed in the folded position, the mirror apparatus body 74 is in the front-to-back direction (the vertical direction in FIGS. 5 and 6) along the surface of the door 73 of the vehicle and never largely protrudes in directions other than the lateral direction.

The composite antenna 66 is incorporated in the mirror apparatus body 74 of the side mirror apparatus 14. The loop antenna 62 of the composite antenna 66 is disposed inside the side mirror 76 along the circumference of the side mirror 76 (for example, the loop antenna 62 is disposed in a space between the side mirror 76 and the mirror apparatus body 74). The ferrite bar antenna 64 is incorporated in the upper end of the mirror apparatus body 74, that is, in a portion above the side mirror 76 so that the ferrite bar extends in the horizontal direction (for example, the ferrite bar antenna 64 can be embedded in the mirror apparatus body 74).

In the side mirror apparatus 14 thus incorporating the composite antenna 66, it is desirable that the mirror apparatus body 74 be held in the folded position when the portable unit 4 is used, in other words, when the vehicle is parked. By thus holding the mirror apparatus body 74 in the folded position, the directivity of the transmission signal from the loop antenna 62 is a loop form extending in the front-to-back direction of the vehicle, and the directivity of the transmission signal from the ferrite bar antenna 64 is a loop form extending in the left-to-right direction of the vehicle. Therefore, when the driver approaches the driver-side door 73 from the front, the rear, the left or the right, the portable unit 4 carried by the driver reliably receives the start signal from the composite antenna 66. The placement of the mirror apparatus body 74 in the unfolded position and in the folded position is performed by mirror actuation means 80 (see FIG. 3) comprising an electric motor rotated in the normal and the reverse directions.

Referring again to FIG. 3, the illustrated microcomputer 48 includes control means 82 for controlling the actuation of means in the control apparatus body 2, for example, the start signal transmission module 46, the communication signal reception means 50 and the communication signal transmitting means 58, and timer means 84. The communication signal reception means 50 receives the communication signal from the portable unit side. The received communication signal is supplied to the microcomputer 48. In association with the communication signal reception means 50, an antenna 86 for receiving the communication signal is provided. The power source control means 52 is operation-controlled by the control means 82 of the microcomputer 48, and is actuated after a predetermined time (considering the time necessary for the portable unit 4 having received the start signal to be activated, the predetermined time is set to a time somewhat longer than the considered time) has elapsed since the transmission of the start signal from the start signal transmission module 46. When the power source control means 52 is actuated, current from the battery 54 is supplied to the communication signal reception means 50, so that the communication signal reception means 50 is placed in a state in which the means 50 can perform reception. A proximity sensor 90 is disposed in the proximity of a handle 88 of the driver-side door of the vehicle (see FIG. 1). When the power source control means 52 is actuated, current from the battery 54 is supplied to the proximity sensor 90, so that the proximity sensor 90 is placed in a state in which the sensor 90 can perform detection. The proximity sensor 90 can be formed of, for example, a capacitance sensor. When the driver approaches the proximity sensor 90, the proximity sensor 90 generates a detection signal. To the carrier sensing means 56, a reception signal from the communication signal reception means 50 is supplied. The carrier sensing means 50 generates a communication possible signal when the detection signal level of the received communication signal is not lower than a predetermined level, and supplies the communication possible signal to the microcomputer 48. The level of the vehicle-side detection signal of the communication signal sent out from the portable unit side increases as the driver of the vehicle carrying the portable unit 4 approaches the vehicle. Therefore, when the driver is in a predetermined range from the vehicle that the driver drives, the detection signal level of the communication signal is the predetermined level or higher and the carrier sensing means 36 generates the communication possible signal, so that communication of the communication signal with the vehicle becomes possible as described later.

The communication signal transmitting means 58 transmits the communication signal from the control apparatus body 2 to the portable unit side. In association with the communication signal transmitting means 58, an antenna 92 for transmitting the communication signal is provided. In the memory means 60, a vehicle-side identification code is stored. The identification code corresponds to the portable-unit-side identification code, and a vehicle code assigned to each individual vehicle is stored. Instead of the vehicle code, a personal code associated with the driver may be used. The wireless control apparatus may be configured so that the identification code as well as the portable-unit-side identification code can simultaneously be changed as needed. In this embodiment, the communication signal transmitted from the communication signal transmitting means 58 includes the identification code stored in the memory means 60. The means 46, 50, 52, 56 and 58 in the control apparatus body 2 can be formed of, for example, electric circuits.

The vehicle is provided with a passenger sensor 92 for detecting the number of passengers including the driver in the vehicle. The passenger sensor 92 can be formed of, for example, a combination of an infrared projector and a receiver for receiving infrared rays. When there is a passenger in the vehicle, the infrared rays from the infrared projector are intercepted by the passenger, whereby the passenger sensor 92 detects that there is a passenger in the vehicle. A detection signal from the passenger sensor 92 is supplied to the microcomputer 48.

In this embodiment, control associated with the door locking of the vehicle and control associated with the side mirror apparatuses 14 can be performed by the use of the portable unit 4. The side mirror apparatuses 14 are each provided with the mirror actuation means 80. By actuating the mirror actuation means 80, for example, in a predetermined direction which is the normal direction (or a direction opposite to the predetermined direction which is a reverse direction), the side mirror apparatuses 14 are placed in the unfolded position (or the folded position). The doors of the vehicle are each provided with locking means 94 for locking the doors. The locking means 94 are each provided with unlocking means 96. When the locking means 94 is operated, the corresponding door is locked, so that the door cannot be opened even if the door handle is operated. When the unlocking means 96 is operated, the door locked by the locking means 94 is unlocked, so that the door can be opened by operating the door handle.

In this embodiment, in association with the vehicle-side microcomputer 48, the following are provided: open/closed door detecting means 98; lock condition detection means 100, mirror position detection means 101; an ignition key switch 102; a parking brake switch 104; and a parking position detection switch 106. The open/closed door detecting switch 98 is provided in association with each door of the vehicle, and generates a closed signal when the door is closed. The lock condition detection means 100 is provided in association with the locking means 94 of each door, and generates a locked signal when the locking means 94 is in a locked state. The mirror position detection means 101 is provided in association with the side mirror apparatuses 14, and generates a folded position signal when the side mirror apparatuses 14 are in the folded position. The open/closed door detecting means 98, the lock condition detection means 100 and the mirror position detection means 101 can be formed of, for example, mechanical switches. The ignition key switch 102 is provided in association with a key cylinder (not shown) into which an ignition key (not shown) is inserted, and generates a key insertion signal when the ignition key is inserted. The parking brake switch 104 is provided in association with a parking brake apparatus (not shown), and generates a parking brake signal when the parking brake apparatus is engaged. The parking position detection switch 106 is provided in association with an operation lever (not shown) of an automatic transmission of the vehicle, and generates a parking position signal when the operation level is at a parking position. In a vehicle having a manual transmission, the parking position detection means 106 can be omitted. The signals from the detection means 98, 100, and 101 and the switches 102, 104 and 106 are supplied to the microcomputer 48.

Next, referring mainly to FIGS. 2, 3, 7 and 8, a door lock releasing operation by the wireless control apparatus (and/or an operation to place the side mirror apparatuses 14 in the unfolded position) will be described. First, a portable-unit-side operation will be described with reference to FIGS. 2 and 7. At step S1, it is determined whether the start signal, which is a carrier wave, is received. This state is maintained until the start signal from the vehicle is received. Under this state, the portable unit is held in the signal power operation mode, the portable unit 4 is substantially held in an inoperative state, so that the power of the internal power source 30 is never consumed. When the driver approaches the vehicle and the portable unit 4 receives the start signal from the vehicle side, the process proceeds from step S1 to step S2. That is, when the start signal reception means 16 receives the start signal, the start signal is power-converted, so that the microcomputer 22 operates from the electric power obtained from the start signal. Moreover, the start signal is supplied to the trigger means 18, so that the trigger signal is generated. Then, the process proceeds to step S3, where the reset means 20 generates a reset signal based on the trigger signal. At step S4, the microcomputer 22 is reset by the reset signal, whereby the operation of the microcomputer 22 is substantially started.

Then, at step S5, switching to the power operation mode is performed by the operation power switching means 24. When the mode is thus switched, power is supplied from the internal power source 30 to the portable unit 4, and thereafter, the portable unit 4 is operated by the internal power source 30. That is, the power from the internal power source 30 is supplied to the microcomputer 22, the power source control means 34 and the communication signal reception means 32, etc. When the power from the internal power source 30 is thus supplied, the process proceeds to step S6, where the control means 26 controls the power source control means 34 as required and supplies power to the communication signal reception means 32, so that the communication signal reception means 32 is held in a standby state in which the communication signal from the vehicle side can be received.

Then, at step S7, the carrier sensing means 36 determines the detection signal level of the communication signal received by the communication signal reception means 32. When the detection signal level is not lower than a predetermined level, it is determined that communication with the vehicle side is possible and the communication possible signal is generated. Then, the process proceeds to step S8. When the communication possible signal is not generated continuously for, for example, approximately 0.1 seconds or 10 milliseconds at step S7, since communication with the vehicle side is substantially impossible, the process shifts to step S9. The time is set by the timer means 28. At step S9, switching from the power source operation mode to the signal power operation mode is performed by the operation power switching means 24, so that the portable unit 4 is placed in a start signal waiting state and is substantially held in an inoperative state. Then, the process returns to step S1. By thus holding the portable unit 4 in the start signal waiting state, the drain on the internal power source 30 can be reduced.

Figure 8:
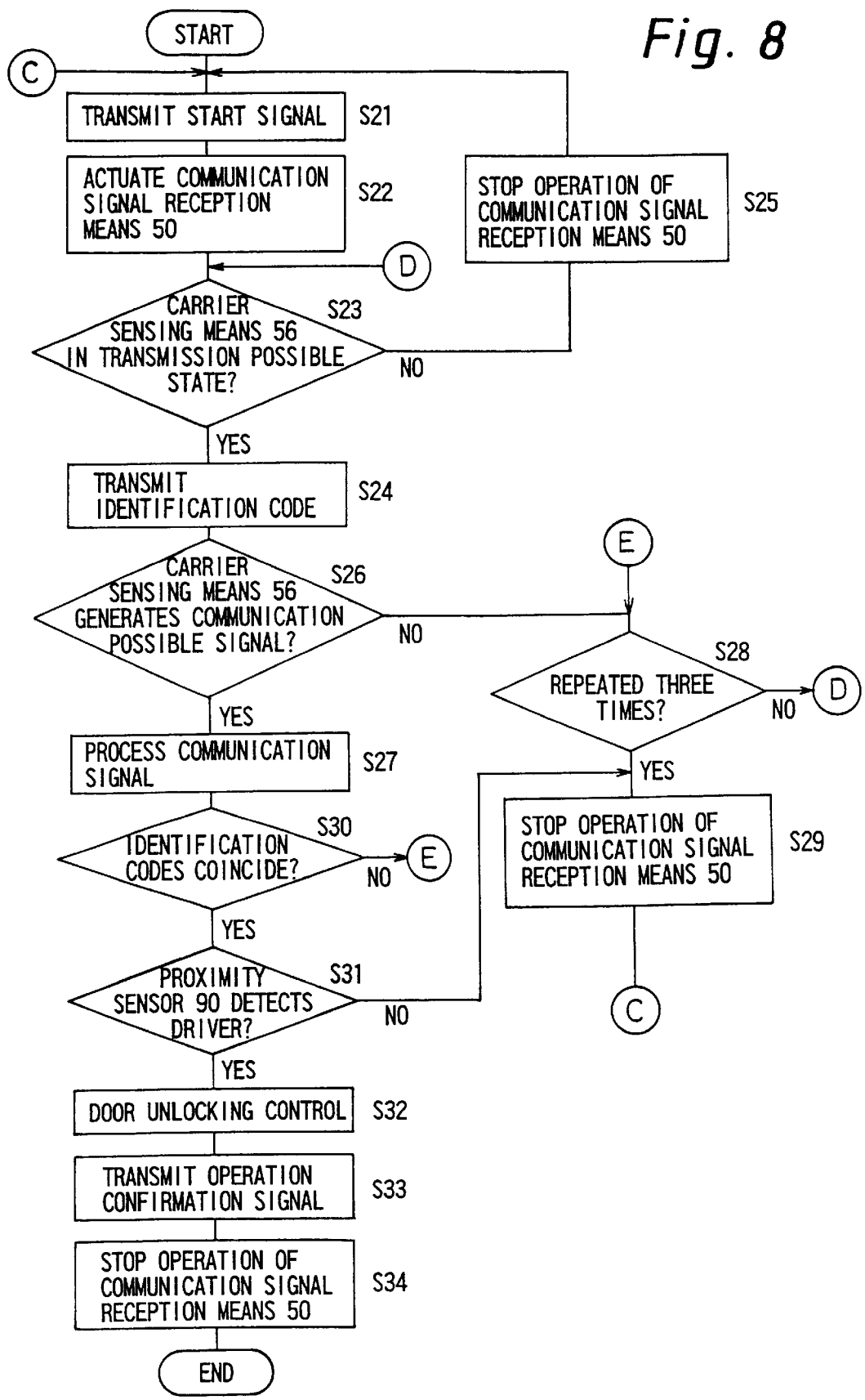
FIG. 8 is a flowchart showing a vehicle-side operation performed when the doors are unlocked.

When the process proceeds from step S7 to step S8, the communication signal from the vehicle side is processed by the control means 26. The communication signal from the vehicle side includes the vehicle-side identification code which is generated at step s24 as shown in FIG. 8, which is described below, and the vehicle-side identification code and the portable-unit-side identification code stored in the memory means 40 are compared (step S10). When the vehicle-side identification code and the portable-unit-side identification code coincide with each other, the process proceeds to step S11. When the vehicle-side identification code and the portable-unit-side identification code do not coincide with each other, the process proceeds to step S12, where a count n of the confirmation operation is incremented by one, and the incremented count n1 is compared with a predetermined value n0, e.g., 3, namely, whether the identification code confirmation operation has been carried out three times is determined. When the identification code confirmation operation has been performed three times (n1≧n0), it is judged that it is unnecessary to further repeat the identification code confirmation operation and the process shifts to step S9. When the identification code confirmation operation has not been carried out three times, the process proceeds to step S13 to confirm the identification code again, and a re-transmission signal is supplied to the vehicle side after a predetermined period of time, e.g., 50 msec has elapsed from the time point of the judgement at step 12. That is, the control means 26 generates the re-transmission signal, the re-transmission signal is transmitted from the communication signal transmitting means 38 to the vehicle side, and the process then returns to step S7, so that the communication signal reception means 32 is placed in the standby state in which the communication signal from the vehicle side can be received. While the identification code confirmation is repeated three times when the identification codes do not coincide with each other in this embodiment, the identification code confirmation may be repeated an appropriate number of times such as twice, or four times or more.

When the process proceeds from step S10 to step S11, it is determined whether the communication signal received by the communication signal reception means 32 includes a vehicle-side operation confirmation signal or not, in other words, whether the communication signal is an operation request signal to request the portable unit side of the contents of control or an operation confirmation signal to transmit to the portable unit side the contents of the operations having been performed on the vehicle side. When the communication signal is the operation request signal (in other words, the communication signal is not the operation confirmation signal), the process proceeds to step S14, where the portable-unit-side identification code and control information are transmitted. That is, the communication signal including the identification code stored in the memory means 40 and the control information is supplied from the control means 26 to the communication signal transmitting means 38, and is transmitted from the communication signal transmitting means 38 to the vehicle side. When the identification code and the control information is thus transmitted, the control means 26 generates an unlocking control signal and a mirror unfolding control signal, and the unlocking control signal and the mirror unfolding control signal are transmitted to the vehicle side as control information signals. Then, the process returns to step S7 and the communication signal reception means 32 is placed in the standby state in which the communication signal from the vehicle side can be received. On the other hand, when the communication signal is the operation confirmation signal, the control operation on the vehicle side has been finished and it is therefore unnecessary to transmit the communication signal from the portable unit 4, so that the process shifts to step S9. Consequently, the portable unit 4 is placed in the signal power operation mode and is substantially in the inoperative state. Since the portable unit 4 is automatically placed in the inoperative state after the wireless control by the portable unit 4 is finished as described above, the drain on the internal power source 30 can be reduced.

The reception of the communication signal and the transmission of the communication signal in the portable unit 4 are performed by the use of an output signal of the carrier sensing means 36. In this embodiment, the carrier sensing means 36 generates a reception-in-progress signal when the communication signal is continuously received for 10 ms or more. While the carrier sensing means 36 is generating the reception-in-progress signal, the control means 26 does not actuate the communication signal transmitting means 38 and consequently, the portable unit 4 does not transmit the communication signal. When the reception of the communication signal from the vehicle side is finished, in other words, the generation of the reception-in-progress signal by the carrier sensing means 36 is finished, the control means 26 determines that transmission is possible and transmits the communication signal to the communication signal transmitting means 38, so that the transmission of the communication signal by the portable unit 4 is performed. The communication signal from the vehicle side is not received while the communication signal is being communicated. Therefore, at this time, it is desirable that the supply of the power of the internal power source 30 to the communication signal reception means 32 be stopped by the power source control means 34 to thereby further reduce the drain on the internal power source 30.

The operation to confirm the control operation on the vehicle side at step S11 may be repeated, for example, approximately three times in order to ensure the confirmation.

Figure 9A:
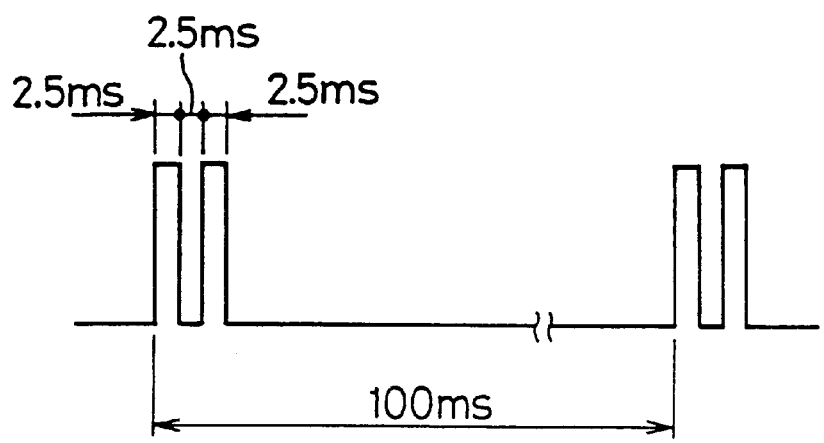
FIG. 9A is a view showing the waveform of a start signal.

Next, an operation performed on the vehicle side will be described with reference to FIGS. 3 and 8. At step S21, at least when it is detected by open/closed door detecting means 98 that the door has been is closed, when it is detected by the ignition key switch 102 that the ignition key has been removed from a cylinder, or when it is detected by the parking brake switch 104 that a parking brake has been put into a braking state, the start signal is generated. By a signal from the control means 82 of the microcomputer 48 is actuated the start signal transmission module 46, and the start signal as a carrier wave in a form of pulse having a relatively short interval, e.g. 2.5 milliseconds as shown in FIG. 9A is transmitted from the start signal transmitting module intermittently, e.g., at intervals of 100 milliseconds. When a predetermined time (a time somewhat longer than the time necessary for the portable unit 4 to be actuated by the start signal) has elapsed since the transmission of the start signal, the process proceeds to step S22, where the communication signal reception means 50 is actuated. In this embodiment, the power source control means 52 is operated by the actuation signal from the control means 82, power from the battery 54 is supplied through the power source control means 52 to thereby actuate the communication signal reception means 50, and the communication signal reception means 50 is held in the standby state in which the communication signal from the portable unit 4 can be received. In this embodiment, since the power supply to the communication signal reception means 50 and the power supply to the proximity sensor 90 are simultaneously controlled, the power is also supplied to the proximity sensor 90. Then, the process proceeds to step S23, where it is determined whether or not the carrier sensing means 56 is generating the reception-in-progress signal representing that the reception of the communication signal from the portable unit is in progress. When the carrier sensing means 56 is not generating the reception-in-progress signal, the transmission of the communication signal from the vehicle side is enabled, and the process proceeds to the next step S24. When the carrier sensing means 56 is generating the reception-in-progress signal, since the transmission from the vehicle-side cannot be performed, the process proceeds to step S25, where the current supply from the battery 54 to the communication signal reception means 50 is stopped and concurrently therewith, the current supply to the proximity sensor 90 is stopped. Then, the process returns to step S21. By thus stopping the supply of the current from the battery 54, the drain on the battery can be reduced.

When the process proceeds from step S23 to step S24, the identification code is transmitted from the vehicle side. The identification code stored in the memory means 60 is read out, and the communication signal including the identification code is supplied from the control means 82 to the communication signal transmitting means 58 and is transmitted from the communication signal transmitting means 58 to the portable unit 4.

Then, the process proceeds to step S26, where the carrier sensing means 56 determines the detection signal level of the communication signal from the portable unit side received by the communication signal reception means 52. When the detection signal level is not lower than a predetermined level, the carrier sensing means 56 determines that communication with the portable unit side is possible and generates the communication possible signal. Then, the process proceeds to step S27. On the other hand, when the communication possible signal is not generated continuously for, for example, approximately 0.1 second at step S26, the process shifts to step S28. The time is set by the timer means 84. At step S28, it is determined whether an operation to confirm the reception of the communication signal from the portable unit side has been performed three times or not. When the reception confirmation operation has not been performed three times, the process proceeds from step S28 to step S23 and the transmission of the identification code is performed. When the reception confirmation operation has been performed three times, the process proceeds from step S28 to S29, where it is determined that communication with the portable unit 4 is impossible and the operation of the communication signal reception means 50 (and the proximity sensor 90) is stopped. Then, the process returns to step S21. In this case, the drain on the battery 54 can also be reduced by bringing the communication signal reception means 50 into the inoperative state.

When the process proceeds from step S26 to step S27, the communication signal from the portable unit side is processed by the control means 82. The communication signal from the portable unit side includes the portable-unit-side identification code and a control information signal. First, at step S30, the portable-unit-side identification code and the vehicle-side identification code stored in the memory means 60 are compared. When the vehicle-side identification code and the portable-unit-side identification code coincide with each other, the microcomputer 48 is placed in a control waiting state and the process proceeds to step S31. When the portable-unit-side identification code and the vehicle-side identification code do not coincide with each other, the process proceeds to step S28, where it is determined whether the identification code confirmation operation has been performed three times or not. When the identification code confirmation operation has been performed three times, it is determined that it is unnecessary to further repeat the identification code confirmation operation and the process shifts to step S29. When the identification code confirmation operation has not been performed three times, the process returns to step S23 to confirm the identification code again and the identification code is again supplied to the portable unit side. While the identification code confirmation is repeated three times when the identification codes do not coincide with each other also on the vehicle side in this embodiment, the identification code confirmation may be repeated an appropriate number of times such as twice, or four times or more.

When the process proceeds from step S30 to step S31, it is determined whether the proximity sensor 90 detects the driver or not. When the proximity sensor 90 does not detect the driver, in other words, the driver does not approach the driver-side door 73 (FIG. 5) for a predetermined period of time after the portable-unit-side identification code and the vehicle-side identification code coincide with each other on the vehicle side, the proximity sensor 90 does not generate a detection signal. In such a case, the process returns to step S21 by way of step S29. When the proximity sensor 90 detects the driver and generates the detection signal, the process proceeds to step S32, where door unlocking control and mirror unfolding control are performed. In this embodiment, the microcomputer 48 is supplied with the closed signal from the open/closed door detecting means 98 and with a locked signal from the lock condition detection means. When a folded position signal is similarly supplied from the mirror position detection means 101, the locking means 94 of each door is held in the locked state and the side mirror apparatuses 14 are held in the folded position. In such a case, the unlocking control and the mirror unfolding control are performed. That is, the control means 84 actuates the unlocking means 96 and the mirror actuation means 80 based on the unlocking control signal and the mirror unfolding control signal, so that the locked state of the locking means 94 of each door is released and the side mirror apparatuses 14 are placed in the unfolded position. Consequently, only by the driver approaching the vehicle, the doors can be unlocked and the position of the side mirror apparatuses 14 can be changed from the folded position to the unfolded position.

When the unlocking of the locked state of the locking means 94 of each door and the placement of the side mirror apparatuses 14 in the unfolded position are finished, the process proceeds to step S33, where an operation confirmation signal to confirm the finish of the control operations is generated by the control means 82 and the operation confirmation signal is transmitted from the communication signal transmitting means 58 to the portable unit 4. Then, at step S34, the operation of the communication signal reception means 50 is stopped and no start signal is generated. Thus, the wireless control by the portable unit 4 is finished. Since the communication signal reception means 50 is held in the inoperative state even after the transmission of the operation confirmation signal, the drain on the battery 54 can be reduced. Since the start signal is not generated at the vehicle side, the portable unit 4 is maintained in the signal power operation mode, so that the drain on the internal power source 30 can be reduced.

The unlocking of the locked state of the locking means 94 and the placement of the side mirror apparatuses 14 in the unfolded position by the portable unit 4 are performed in the above-described manner. While the current supply to the communication signal reception means 50 and the current supply to the proximity sensor 90 are similarly controlled in the above-described embodiment, the current supply to the proximity sensor 90 may be performed before the driver detection operation at step S31. In this case, the drain on the battery 54 can further be reduced.

While merely the identification code is transmitted in the transmission of the identification code from the vehicle side to the portable unit side and in the transmission of the identification code from the portable unit side to the vehicle side in the illustrated embodiment, in order to ensure the security of the identification code, the identification code may be transmitted in encrypted form and deciphered after reception.

While the operation to release the locked state of the locking means 94 of the doors has been described, the locking of the locking means 94 and the placement of the mirror apparatuses 14 in the folded position can be performed in a similar manner. In such a case, the locking and the placement are performed in the following manner: The generation of the key insertion signal by the ignition key switch is finished on the vehicle side. The parking brake switch 104 generates the parking brake signal. The parking position detection switch 106 generates the parking position signal. Further, the passenger sensor 92 stops the generation of a passenger detection signal. When the doors of the vehicle is opened with these conditions satisfied, the operation of the flowchart of FIG. 8 is started and the transmission of the start signal from the vehicle-side control apparatus body 2 is started. In the door locking, the portable unit 4 transmits a door locking control signal and a mirror folding control signal to the vehicle side, and on the vehicle side, when the proximity sensor 90 detects the driver, the locking means 94 is held in the locked state based on the locking control signal and the mirror folding control signal from the portable unit 4, and the mirror actuation means 80 is actuated to hold the side mirror apparatus 14 in the folded position. Thus, the locking means 94 and the side mirror apparatuses 14 can automatically be held in the locked state and in the folded state, respectively, without performing any operation.

When the voltage of the internal power source 30 of the portable unit 4 decreases, switching to the signal power operation mode is performed in the portable unit 4, so that the portable unit 4 is operated by a power signal from the vehicle side in the following manner. In the portable unit 4, the voltage of the internal power source 30 is supplied to the voltage monitoring means 42, and the voltage monitoring means 42 monitors the voltage of the internal power source 30. When the voltage of the internal power source 30 decreases to a predetermined value or lower, the voltage monitoring means 42 generates the control switching signal. Based on the control switching signal, the operation power switching means 24 performs switching from the power source operation mode to the signal power operation mode, whereby the operation by the internal power source 30 is finished. When the control switching signal is generated, the control switching signal is supplied from the communication signal transmitting means 38 of the portable unit 4 to the vehicle-side communication signal reception means 50, and based on the control switching signal, the vehicle-side control means 82 is placed in a power transmission mode. When the vehicle-side control apparatus body 2 is placed in the power transmission mode, the control means 82 generates a power transmission signal, and based on the power transmission signal, a power transmission signal is transmitted from the start signal transmission module 46. The power transmission signal transmitted from the start signal transmission module 46 is received by the start signal reception means 16, and the microcomputer 22 is operated by the start signal in a manner as described above. In this case, since the voltage of the internal power source 30 is decreased, the operation power switching means 24 maintains the signal power operation mode without performing switching to the power source operation mode. Consequently, the portable unit 4 including the microcomputer 22 operates from the electric power obtained from the power transmission signal from the vehicle side, so that the wireless control can be performed by the portable unit 4 even after the internal power source 30 is exhausted.

Figure 9B:
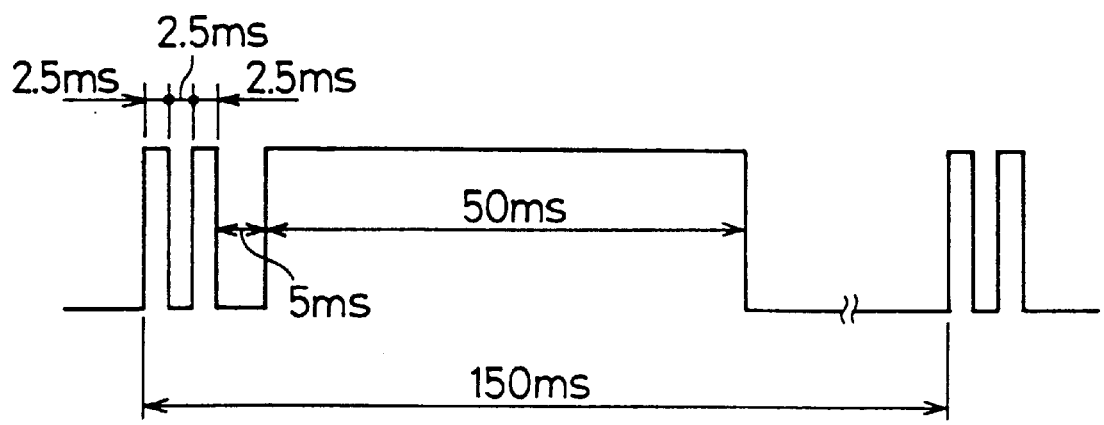
FIG. 9B is a view showing the waveform of a power transmission signal.

As the start signal transmitted from the vehicle side, for example, the signal shown in FIG. 9A is used. As the power transmission signal transmitted from the vehicle side, for example, the signal shown in FIG. 9B is used. As shown in FIG. 9A, the start signal has a period of, for example, approximately 100 ms, and in the initial part of the period, a pulse signal of 2.5 ms is output twice. On the contrary, as shown in FIG. 9B, the power transmission signal has a period of, for example, 150 ms, and a pulse signal of 2.5 ms similar to that of the start signal is output twice in the initial part of the period and a long pulse signal is output once, for example, 5 ms after the output of the pulse signal of 2.5 ms. The long pulse signal is used as the power to actuate the portable unit 4, and the period thereof can be set to approximately 50 ms. It is desirable that the long pulse signal that is output once have a variable period so that the long pulse signal is continuously generated while the portable unit 4 is being operated, in other words, the communication signal is being transmitted from the portable unit 4, namely, from step s24 to step 34 in FIG. 8. By using such a power transmission signal, the portable unit 4 can be operated as required by the power converted by the power transmission signal.

While a wireless control apparatus and a portable unit used for the same according to the invention have been described, the invention is not limited to the embodiment but various variations and modifications are possible without departing from the scope of the invention.

For example, while the invention is applied to the control of the locking means 94 of the doors and the placement of the side mirror apparatuses 14 in the illustrated embodiment, the invention is also applicable to the control of opening and closing of the trunk of the vehicle and the control of operation of a car-mounted apparatus such as a radio or a CD player. In this case, for the trunk opening and closing control, opening and closing means for opening the trunk by a signal from the portable unit 4 is provided in association with the trunk, and for the car-mounted apparatus operation control, car-mounted apparatus actuation means for actuating a car-mounted apparatus by a signal from the portable unit 4 is provided. When a car-mounted apparatus or the like is controlled, the following arrangement can be used. Information on the actuation of the car-mounted apparatus is incorporated in the communication signal and transmitted from the vehicle side to the portable unit side, and the actuation information is stored in the memory means 40 of the portable unit 4.

While the comparison of the identification codes is performed on both the vehicle side and the portable unit side in the illustrated embodiment, it is unnecessary to do so but the comparison may be performed on only one of the vehicle side and the portable unit side.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A portable unit of a wireless control apparatus for vehicles, comprising:

start signal reception means for receiving a start signal for electromagnetic induction from a vehicle side apparatus of a vehicle;

reset means for generating a reset signal based on the start signal received by the start signal reception means;

memory means for storing vehicle information;

communication signal reception means for receiving a communication signal from the vehicle;

carrier sensing means for generating a communication possible signal when a detection signal level of the received communication signal is not lower than a predetermined level;

communication signal transmitting means for transmitting a communication signal to the vehicle side apparatus;

control means for controlling operation of the communication signal transmitting means; and operation power switching means for selecting between a signal power operation mode in which the portable unit operates from electric power obtained from the start signal and a power source operation mode in which the portable unit operates from an internal power source, wherein the control means operates using electric power obtained from the start signal when the start signal from the vehicle side apparatus is received in the signal power operation mode, while the control means is reset by the reset signal of the reset means generated based on the start signal, wherein the operation power switching means switches from the signal power operation mode to the power source operation mode after the control means is reset by the reset signal, so that the control means operates using electric power from the internal power source and the communication signal transmitting means transmits to the vehicle side apparatus the vehicle information stored in the memory means, wherein the communication signal from the vehicle side apparatus includes a vehicle-side identification code, wherein the vehicle information stored in the memory means includes a portable-unit-side identification code, wherein the control means compares the vehicle-side identification code included in the communication signal and the portable-unit-side identification code when the communication signal reception means receives the communication signal from the vehicle side, and wherein the operation power switching means switches from the power source operation mode to the signal power operation mode when the vehicle-side identification code included in the communication signal and the portable-unit-side identification code are different, whereby the operation of the control means is stopped.

2. The portable unit of a wireless control apparatus of claim 1, further comprising:

carrier sensing means for determining a reception condition of the communication signal, wherein the carrier sensing means generates a communication possible signal when a detection signal level of the communication signal received by the communication signal reception means is not lower than a predetermined level, and wherein the operation power switching means switches from the power source operation mode to the signal power operation mode when the generation of the communication possible signal is not performed continuously for a predetermined time, whereby the operation of the control means is stopped.

3. A wireless control apparatus for vehicles which wirelessly controls a vehicle-side apparatus by the use of a portable unit, the apparatus comprising:

a vehicle-side start signal transmission module for transmitting a start signal for electromagnetic induction;

vehicle-side communication signal reception means for receiving a communication signal;

vehicle-side control means for controlling the operation of the vehicle-side apparatus, the vehicle-side start signal transmission module and vehicle-side communication signal reception means, portable-unit-side start signal reception means for receiving the start signal from the vehicle-side start signal transmission module;

reset means for generating a reset signal based on the start signal received by the portable-unit-side start signal reception means;

portable-unit-side memory means for storing vehicle information;

portable-unit-side communication signal reception means for receiving a communication signal from the vehicle;

portable-unit-side carrier sensing means for generating a communication possible signal when a detection signal level of the received communication signal is not lower than a predetermined level;

portable-unit-side communication signal transmitting means for transmitting a communication signal to the vehicle side apparatus;

portable-unit-side control means for controlling operation of the portable-unit-side communication signal transmitting means;

operation power switching means for selecting between a signal power operation mode in which the portable unit operates from electric power obtained from the start signal and a power source operation mode in which the portable unit operates from an internal power source;

vehicle-side memory means for storing a vehicle-side identification code; and vehicle-side communication signal transmitting means for transmitting a communication signal including the vehicle-side identification code from the vehicle side, wherein the portable-unit-side control means operates using electric power obtained from the start signal, while the portable-unit-side control means is reset by the reset signal of the reset means generated based on the start signal when the start signal from the vehicle-side start signal transmission module is received by the portable-unit-side start signal reception means in the signal power operation mode, wherein the operation power switching means switches from the signal power operation mode to the power source operation mode after the portable-unit-side control means is reset, whereby the portable-unit-side control means operates using electric power from the internal power source and the portable-unit-side communication signal transmitting means transmits the vehicle information stored in the portable-unit-side memory means to the vehicle-side communication signal reception means, wherein the portable unit comprises portable-unit-side communication signal reception means for receiving the communication signal from the vehicle-side communication signal transmitting means, wherein the vehicle information stored in the portable-unit-side memory means includes a portable-unit-side identification code, wherein the portable-unit-side control means compares the vehicle-side identification code included in the communication signal and the portable-unit-side identification code upon receipt of the communication signal from the vehicle-side communication signal transmitting means by the portable-unit-side communication signal reception means, and wherein the operation power switching means switches from the power source operation mode to the signal power operation mode when the vehicle-side identification code included in the communication signal and the portable-unit-side identification code are different, whereby the operation of the control means is stopped.

4. The wireless control apparatus for vehicles of claim 3, wherein the portable unit further comprises portable-unit-side carrier sensing means for determining a reception condition of the communication signal from the vehicle-side communication signal transmitting means, wherein the carrier sensing means generates a communication possible signal when a detection signal level of the reception signal received by the portable-unit-side communication signal reception means is not lower than a predetermined level, and wherein the operation power switching means switches from the power source operation mode to the signal power operation mode when the generation of the communication possible signal is not performed continuously for a predetermined time, whereby the operation of the control means is stopped.

5. The wireless control apparatus for vehicles of claim 4, wherein the start transmission module comprises a composite antenna comprising a loop antenna and a ferrite bar antenna, and wherein the loop antenna and the ferrite bar antenna are arranged such that regions having a high transmitting/receiving sensitivity of directivities of the loop antenna and the ferrite bar antenna area substantially perpendicular to each other.

6. The wireless control apparatus for vehicles of claim 3,
wherein the start transmission module comprises a composite antenna comprising a loop antenna and a ferrite bar antenna, and
wherein the loop antenna and the ferrite bar antenna are arranged such that regions having a high transmitting/receiving sensitivity of directivities of the loop antenna and the ferrite bar antenna are substantially perpendicular to each other.

7. The wireless control apparatus for vehicles of claim 3,
wherein the portable unit comprises voltage monitoring means for monitoring a voltage of the internal power source,
wherein the portable-unit-side control means generates a control switching signal and the operation power switching means switches from the power source operation mode to the signal power operation mode based on the control switching signal when the voltage of the internal power source decreases to a predetermined value or lower, and
wherein the vehicle-side control means actuates the start signal transmission module based on the control switching signal from the portable unit side and the portable-unit-side control means operates from the electric power obtained from a power signal from the start signal transmission module.

8. The wireless control apparatus for vehicles of claim 4,
wherein the portable unit comprises voltage monitoring means for monitoring a voltage of the internal power source,
wherein the portable-unit-side control means generates a control switching signal and the operation power switching means switches from the power source operation mode to the signal power operation mode based on the control switching signal when the voltage of the internal power source decreases to a predetermined value or lower, and
wherein the vehicle-side control means actuates the start signal transmission module based on the control switching signal from the portable unit side and the portable-unit-side control means operates from the electric power obtained from a power signal from the start signal transmission module.

9. A portable unit of a wireless control apparatus for vehicles, comprising:
direct current power generating means for generating direct current power as an output upon receipt of a signal for electromagnetic induction;
an internal power source;
memory means for storing vehicle information;
communication signal transmitting means for transmitting a communication signal;
control means for the portable unit for reading out the information stored in the memory means and causing the communication signal transmitting means to transmit the read-out information as a communication signal;
operation power switching means responsive to the output of the direct current power generating means, for selecting a signal power operation mode where electric power from the internal power source is not supplied to the communication signal transmitting means and the control means for the portable unit in an absence of the output from the direct current power generating means, and a power source operation mode where the electric power from the internal power source is supplied to the communication signal transmitting means and the control means for the portable unit in a presence of the output from the direct current power generating means; and
communication signal reception means for receiving a communication signal from the vehicle side apparatus,
wherein the communication signal from the vehicle side apparatus includes a vehicle-side identification code,
wherein the vehicle information stored in the memory means includes a portable-unit-side identification code,
wherein the control means compares the vehicle-side identification code included in the communication signal and the portable-unit-side identification code when the communication signal reception means receives the communication signal from the vehicle side, and
wherein the operation power switching means switches from the power source operation mode to the signal power operation mode when the vehicle-side identification code included in the communication signal and the portable-unit-side identification code are different, whereby the operation of the control means is stopped.

10. A wireless control apparatus for vehicles which wirelessly controls a vehicle-side operation apparatus by the use of a portable unit, the apparatus comprising:
a vehicle-side operation apparatus mounted on a vehicle;
a transmitting module for generating a signal for electromagnetic induction and being mounted on the vehicle;
a vehicle-side reception means for receiving a portable-unit-side communication signal and being mounted on the vehicle;
vehicle-side control means for causing the vehicle-side operation apparatus to carry out a predetermined operation in response to an output from the vehicle-side reception means and being mounted on the vehicle;
a portable unit comprising direct current power generating means for generating direct current power as an output upon receipt of a signal for electromagnetic induction, an internal power source, memory means for storing vehicle information, communication signal transmitting means for transmitting a communication signal, control means for reading out the information stored in the memory means and causing the communication signal transmitting means to transmit the read-out information as a communication signal, and operation power switching means responsive to the output of the direct current power generating means and for selecting a signal power operation mode where electric power from the internal power source is not supplied to the communication signal transmitting means and the control means for the portable unit in an absence of the output from the direct current power generating means, and a power source operation mode where the electric power from the internal power source is supplied to the communication signal transmitting means and the control means for the portable unit in a presence of the output from the direct current power generating means;
vehicle-side memory means for storing a vehicle-side identification code; and
vehicle-side communication signal transmitting means for transmitting a communication signal including the vehicle-side identification code from the vehicle side,
wherein the portable unit comprises portable-unit-side communication signal reception means for receiving the communication signal from the vehicle-side communication signal transmitting means, wherein the vehicle information stored in the portable-unit-side memory means includes a portable-unit-side identification code, wherein the portable-unit-side control means compares the vehicle-side identification code included in the communication signal and the portable-unit-side identification code upon receipt of the communication signal from the vehicle-side communication signal transmitting means by the portable-unit-side communication signal reception means, and wherein the operation power switching means switches from the power source operation mode to the signal power operation mode when the vehicle-side identification code included in the communication signal and the portable-unit-side identification code are different, whereby the operation of the control means is stopped.

* * * * *